(12) United States Patent
Gottlieb et al.

(10) Patent No.: US 9,709,427 B2
(45) Date of Patent: Jul. 18, 2017

(54) FLOWMETER AND METHOD

(71) Applicants: Emanuel Gottlieb, Upper St. Clair, PA (US); Donald R. Augenstein, Pittsburgh, PA (US)

(72) Inventors: Emanuel Gottlieb, Upper St. Clair, PA (US); Donald R. Augenstein, Pittsburgh, PA (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/196,998

(22) Filed: Jun. 29, 2016

(65) Prior Publication Data

US 2016/0305804 A1  Oct. 20, 2016

Related U.S. Application Data

(60) Continuation of application No. 14/453,373, filed on Aug. 6, 2014, now Pat. No. 9,389,108, which is a continuation of application No. 13/565,341, filed on Aug. 2, 2012, now Pat. No. 8,806,734, which is a division of application No. 12/653,087, filed on Dec. 8, 2009, now Pat. No. 8,245,581.

(51) Int. Cl.
*G01F 1/66* (2006.01)
(52) U.S. Cl.
CPC ............... *G01F 1/66* (2013.01); *G01F 1/662* (2013.01); *G01F 1/667* (2013.01); *Y10T 29/494* (2015.01); *Y10T 29/49826* (2015.01)

(58) Field of Classification Search
CPC . G01F 1/66; G01F 1/667; G01F 1/662; Y10T 29/49826; Y10T 29/494
See application file for complete search history.

(56) References Cited

U.S. PATENT DOCUMENTS

| | | | | |
|---|---|---|---|---|
| 4,398,424 A | * | 8/1983 | Abts | G01N 29/24 73/61.75 |
| 7,213,468 B2 | * | 5/2007 | Fujimoto | C21D 7/00 702/48 |
| 7,410,308 B2 | * | 8/2008 | Qian | G02B 6/255 385/95 |

* cited by examiner

*Primary Examiner* — Sarang Afzali
*Assistant Examiner* — Ruth G Hidalgo-Hernandez
(74) *Attorney, Agent, or Firm* — Ansel M. Schwartz

(57) ABSTRACT

A flowmeter for detecting fluid flow rates in a pipe includes a tube having a channel disposed in the pipe through which fluid in the pipe flows. The flowmeter includes an upstream transducer in contact with the pipe and positioned so plane waves generated by the upstream transducer propagates through the channel. The flowmeter includes a downstream transducer in contact with the pipe and positioned so plane waves generated by the downstream transducer propagate through the channel and are received by the upstream transducer which produces an upstream transducer signal. The downstream transducer receives the plane waves from the upstream transducer and provides a downstream transducer signal. The flowmeter includes a controller in communication with the upstream and downstream transducers which calculate fluid flow rate from the upstream transducer signal and the downstream transducer signal. A method for detecting fluid flow rates in a pipe.

7 Claims, 2 Drawing Sheets

FLOWMETER AND METHOD

CROSS-REFERENCE TO RELATED APPLICATIONS

This application is a continuation of U.S. patent application Ser. No. 14/453,373 filed Aug. 6, 2014, now U.S. Pat. No. 9,389,108, which is a continuation of U.S. patent application Ser. No. 13/565,341 filed Aug. 2, 2012, now U.S. Pat. No. 8,806,734, which is a divisional of U.S. patent application Ser. No. 12/653,087 filed Dec. 8, 2009, now U.S. Pat. No. 8,245,581 issued Aug. 21, 2012, all of which are incorporated by reference herein.

FIELD OF THE INVENTION

The present invention is related to a flowmeter for detecting fluid flow rates in a pipe having a tube with a channel disposed in the pipe through which fluid in the pipe flows and plane waves generated by an upstream ultrasonic transducer and a downstream ultrasonic transducer propagate. (As used herein, references to the "present invention" or "invention" relate to exemplary embodiments and not necessarily to every embodiment encompassed by the appended claims.) More specifically, the present invention is related to a flowmeter for detecting fluid flow rates in a pipe having a tube with a channel disposed in the pipe through which fluid in the pipe flows and plane waves generated by an upstream ultrasonic transducer and a downstream ultrasonic transducer propagate, where the tube is made of a sound absorbing material so that essentially all non-fluid paths of sound are absorbed.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The current ultrasonic flow meter arrangement uses two transducers at opposing ends of a pipe where one is upstream from the fluid flow and other is downstream from the fluid flow, both transducers transmit and receive signals. Each transducer generates plane waves into the fluid and surrounding pipe wall. The difference in transit times between the upstream and downstream signal is used to calculate the flow rate. Since sound travels faster in the pipe wall than in the fluid medium, the receiving transducer has noise because the sound enters the pipe and arrives at a time preceding the sound that travels in the liquid. The noise level is significant because it reduces the accuracy of the flow measurement and results in a poor or no measurement at low flow rates.

Furthermore, traditionally, polymers with scattering fillers (such as metal or glass or microspheres) are used as backing masses for ultrasonic transducers. The use of an attenuative backing mass improves the bandwidth of the transmitted ultrasound signal of a transducer by absorbing the sound from the back side of the transducer and not allowing reflections to occur. Polymers with scattering fillers, it is believed, have never been used as pipe wall sound attenuators in the use of an ultrasonic transit time flow measurement.

BRIEF SUMMARY OF THE INVENTION

The present invention is applicable for measuring flow rates, particularly low flow rates, with ultrasonic transit time technology. The application is specifically applied to monitoring chemical fluid injection in subsea oil wells. The invention is directed to the use of a sound absorbing tube to direct the flow. This tube attenuates sound of all acoustic paths except that through the fluid. This improvement makes possible a flow measurement at very low flow rates through very small bore pipes.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
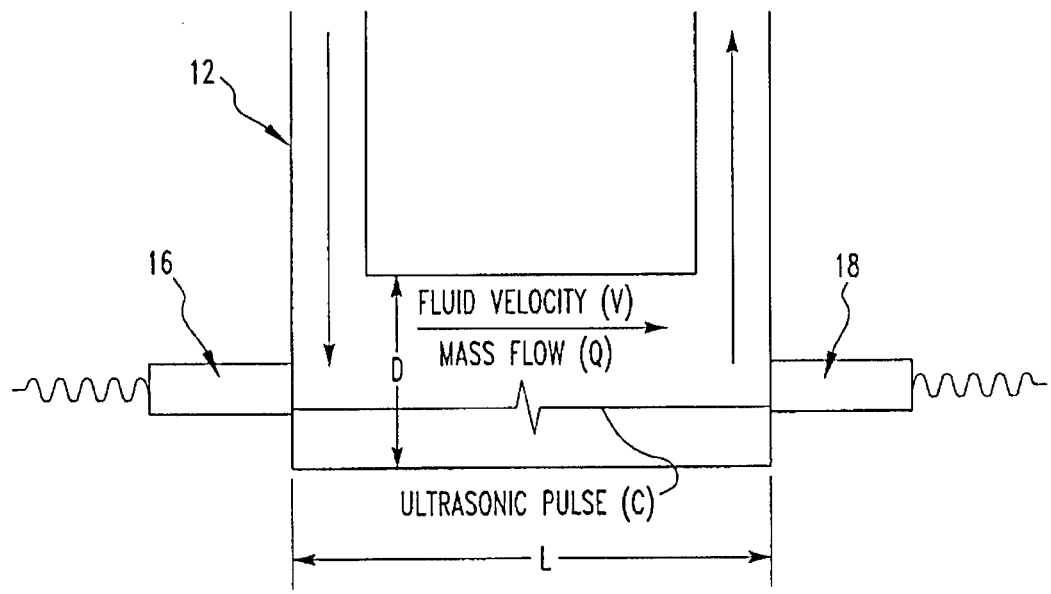
FIG. 1 shows a flowmeter of the present invention.
Figure 3:
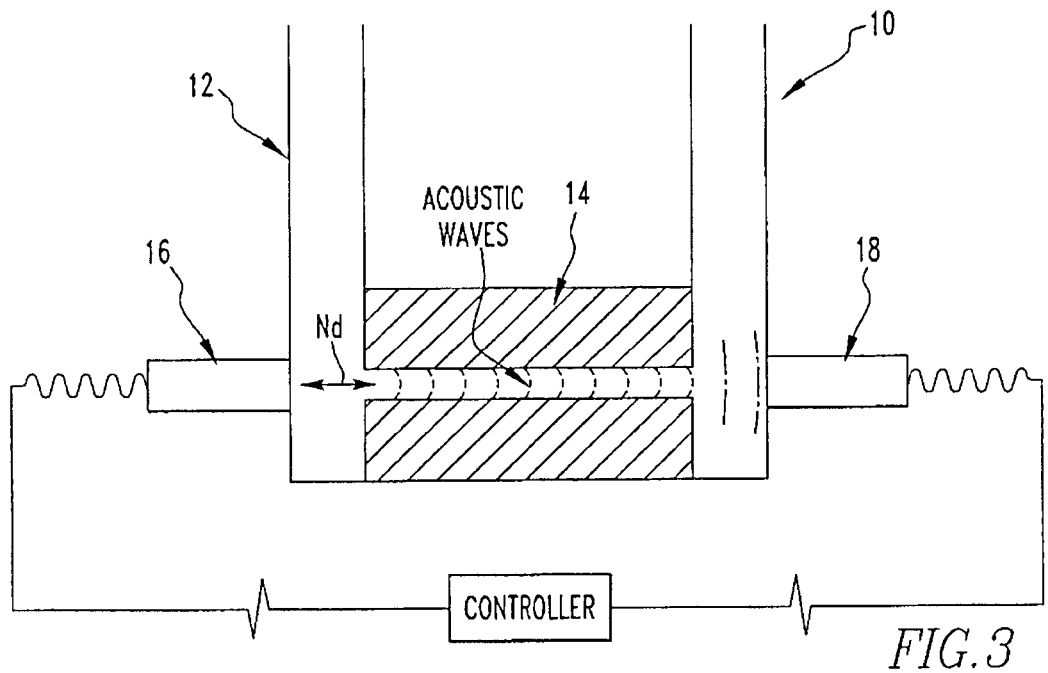
FIG. 3 shows a low flow meter arrangement.

Referring now to the drawings wherein like reference numerals refer to similar or identical parts throughout the several views, and more specifically to FIGS. 1 and 3 thereof, there is shown a flowmeter 10 for detecting fluid flow rates in a pipe 12. The flowmeter 10 comprises a tube 14 having a channel disposed in the pipe 12 through which fluid in the pipe 12 flows. The flowmeter 10 comprises an upstream ultrasonic transducer in contact with the pipe 12 and positioned in alignment with the channel so plane waves generated by the upstream transducer 16 propagate through the channel. The flowmeter 10 comprises a downstream ultrasonic transducer in contact with the pipe 12 and positioned so plane waves generated by the downstream transducer 18 propagate through the channel and are received by the upstream transducer 16 which produces an upstream transducer 16 signal. The downstream transducer 18 receives the plane waves from the upstream transducer 16 and provides a downstream transducer 18 signal. The flowmeter 10 comprises a controller 20 in communication with the upstream and downstream transducers 18 which calculate fluid flow rate from the upstream transducer 16 signal and the downstream transducer 18 signal.

The tube 14 may be made of a sound absorbing material so that essentially all non-fluid paths of sound are absorbed. The upstream transducer 16 and the downstream transducer 18 may extend through the pipe 12 wall and acoustically communicate with the pipe 12 interior. The tube 14 may form a seal with the pipe 12 essentially preventing fluid in the pipe 12 leaking around the tube 14.

The tube 14 may be made of a polymer filled with attenuative particles. The polymer may be either an epoxy, nylon, PTFE or PEEK (polyaryletheretherketone). The particles are either metal, glass microspheres, metal oxide or rubber having a size equal to or smaller than the acoustic wavelength. The tube may have a length L and a diameter opening D such that under volume flow conditions where Q>0.2 liters/hour, the tube dimensions $L/D^2$ are greater than 1385/meters when C>1400 m/s.

The present invention pertains to a method for detecting fluid flow rates in a pipe 12. The method comprises the steps of flowing fluid through a channel of a tube 14 disposed in the pipe 12. There is the step of generating plane waves by an upstream transducer 16 in contact with the pipe 12 and positioned in alignment with the channel so the plane waves propagate through the channel and are received by a downstream transducer 18 which produces a downstream transducer 18 signal. There is the step of generating plane waves by the downstream transducer 18 in contact with the pipe 12 and positioned so the plane waves propagate through the channel and are received by the upstream transducer 16 which produces an upstream transducer 16 signal. There is the step of calculating with a controller 20 in communication with the upstream and downstream transducers 18 fluid flow rate from the upstream transducer 16 signal and the downstream transducer 18 signal.

The tube 14 can be made of a sound absorbing material and wherein the generating plane waves by the upstream transducer 16 step may include the step of generating the plane waves by the upstream transducer 16 so that essentially all non-fluid paths of sound are absorbed by the tube 14, and wherein the generating plane waves by the downstream transducer 18 step may include the step of generating the plane waves by the downstream transducer 18 so that essentially all non-fluid paths of sound are absorbed by the tube 14. The generating plane waves by the upstream transducer 16 step may include the step of generating the plane waves by the upstream transducer 16 which extends through the pipe 12 wall and acoustically communicates with the pipe 12 interior, and wherein the generating plane waves by the downstream transducer 18 step may include the step of generating the plane waves by the downstream transducer 18 which extends through the pipe 12 wall and acoustically communicates with the pipe 12 interior. The tube 14 may form a seal with the pipe 12 essentially preventing fluid in the pipe 12 leaking around the tube 14.

Figure 2:
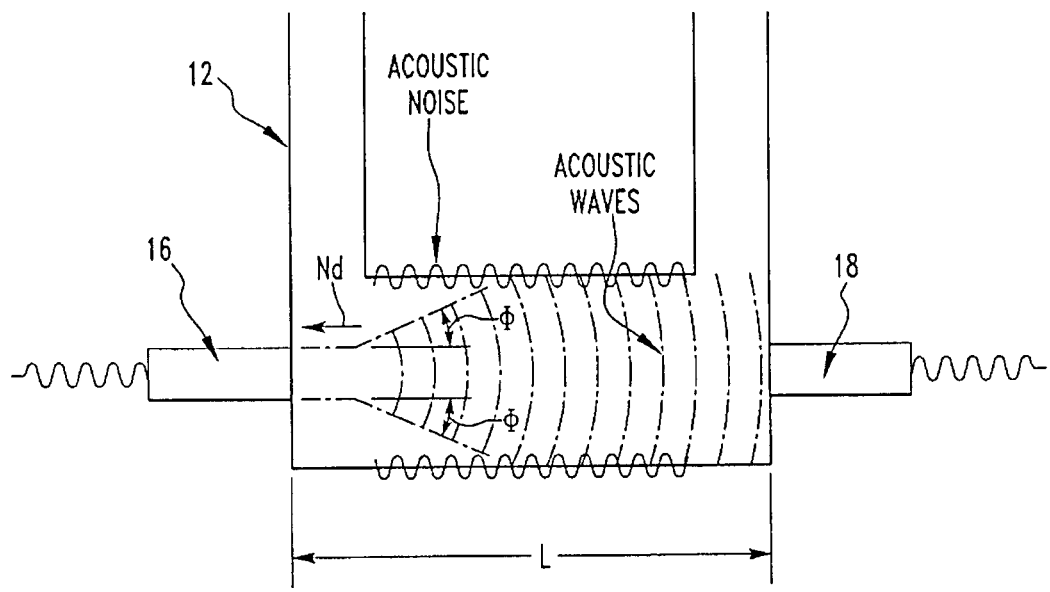
FIG. 2 shows an acoustic signal path.

In the operation of the invention, the current ultrasonic flow meter arrangement uses two wetted transducers at opposing ends of a tube 14 in a pipe 12 where one is upstream from the fluid flow and other is downstream from the fluid flow, both transducers transmit and receive signals (FIG. 1). The difference in transit times between the upstream and downstream signal is used to calculate the flow rate. Each transducer generates plane waves into the fluid and surrounding pipe 12 wall (FIG. 2). The propagation of the sound wave has a profile known as the transducer beam profile.

$$\text{For } \Delta t = \frac{2VL}{C^2} = \frac{8QL}{\pi C^2 D^2}$$

L: path length

C: speed of sound in fluid

V: fluid velocity $C \gg V$ $\Delta t$: $t_2 - t_1$ transit time difference

Q: mass flow

D: diameter of opening

As the mass flow decreases so does the transit time difference between the upstream and downstream flow. By increasing the length "L" of the tube 14 and decreasing the diameter opening "D" the effective $\Delta t$ can be increased such that $\Delta t > 0.1$ ns, under low mass flow conditions the flowmeter 10 has to be designed such that the tube 14 dimensions $$\frac{L}{D^2}$$

can measure a Q as low as 0.2 liters/hour since C is a constant.

For FIG. 1:

$$t_2 = \frac{L}{C - V}$$

$t_1$: upstream transit time $t_2$: downstream transit time

L: path length

C: speed of sound in fluid

V: fluid velocity $$t_1 = \frac{L}{C + V}$$

$C \gg V$ $$V = \frac{C^2 \Delta t}{2L} \quad \Delta t = \frac{2VL}{C^2} = \frac{8QL}{\pi C^2 D^2}$$

$Q = V \cdot \text{Area} \quad Q$: Mass Flow $\quad D$: diameter of opening $$V = \frac{Q}{A} \quad \text{Area} = \frac{\pi D^2}{4}$$

In order to solve for the speed of sound in fluid and fluid velocity the upstream and downstream transit times need to be measured via a controller 20. The controller 20 computes the transit time differences between the upstream and downstream flow. The $\Delta t$ is then used to calculate the fluid velocity for a given flowmeter 10 length "L" for a calculated speed of sound "C". Once the velocity "V" has been calculated then the Mass Flow Q can be determined since the area "A" of the fluid opening or pipe 12 is known.

For FIG. 2:

$\lambda$: wavelength $Nd$: focal length $\quad \varphi = \sin^{-1}\left(\frac{.61\lambda}{r}\right)$ r: radius of the transducer $$Nd = \frac{r^2}{\lambda}$$

$$\lambda = \frac{c}{f}$$

When sound diverges at angle $\varphi$, it then propagates into pipe 12 wall which is received by the opposing transducer as noise.

f: frequency

Since sound travels faster in the solid pipe 12 or tube 14 wall than in the fluid medium, the receiving transducer suffers from acoustic noise from the pipe 12/tube 14 acoustic paths. This acoustic noise arrives at a time preceding the sound that travels in the liquid since sound velocities in the solid are higher than those in the fluid. This noise is significant because it reduces the accuracy of the flow measurement and results in a poor or no measurement at low flow rates. The measure of the effect of this noise is signal to noise ratio.

In order to solve this problem, a tube 14 with acoustically attenuative properties is in inserted within the pipe 12 (FIG. 3). The acoustic tube 14 has a small inner diameter and a large outer diameter. The opening in the tube 14 acts as conduit for the fluid and the fluid path for sound, while the surrounding area acts as sound absorber. After the sound travels through the conduit it begins to spread again but this has no effect on the signal to noise ratio therefore the surrounding sound absorber successfully disables the pipe 12 noise.

The tube 14 is made preferably of a polymer filled with attenuative particles, for example tungsten particles (mesh 200) with a certain volume fraction up to 50%. The polymer can be for example epoxy, nylon, PTFE or PEEK but is not limited to these materials. The choice of polymer is dependent on the pressure rating of the application and its effectiveness in working with the attenuative particles to attenuate sound. The filler can be any metal, metal oxide, or rubber with a small mesh size, the lower the volume fraction of particle filler the higher the acoustic attenuation. Once a cylinder is fabricated then it is machined such that there is an inner diameter for fluid flow. The sound absorbing tube 14 can be threaded on the OD; therefore, it screws into the flowmeter 10. The sound absorbing tube 14 can be glued on the OD; therefore, it bonds into the flowmeter 10. The sound absorbing tube 14 can either press fit or captured by clips or retainers.

Simple ultrasonic flow measurement tests have shown an improvement in the signal to noise ratio at low flow rates. The experimental setup included 5 MHz frequency ultrasonic transducers separated a distance of 4 inches. The tube 14 used had an inner diameter of ¼" and outer diameter of 1". The tube 14 was made of epoxy with tungsten particle filler. For test purposes olive oil was used since it has a similar viscosity to certain injection chemicals to be applied. It is noted that the higher the viscosity of the fluid, the more important the sound absorbing properties become. Specifically, as the viscosity increases, the fluid path acoustic signal is attenuated and the signal to noise ratio decreases.

Figure 4:
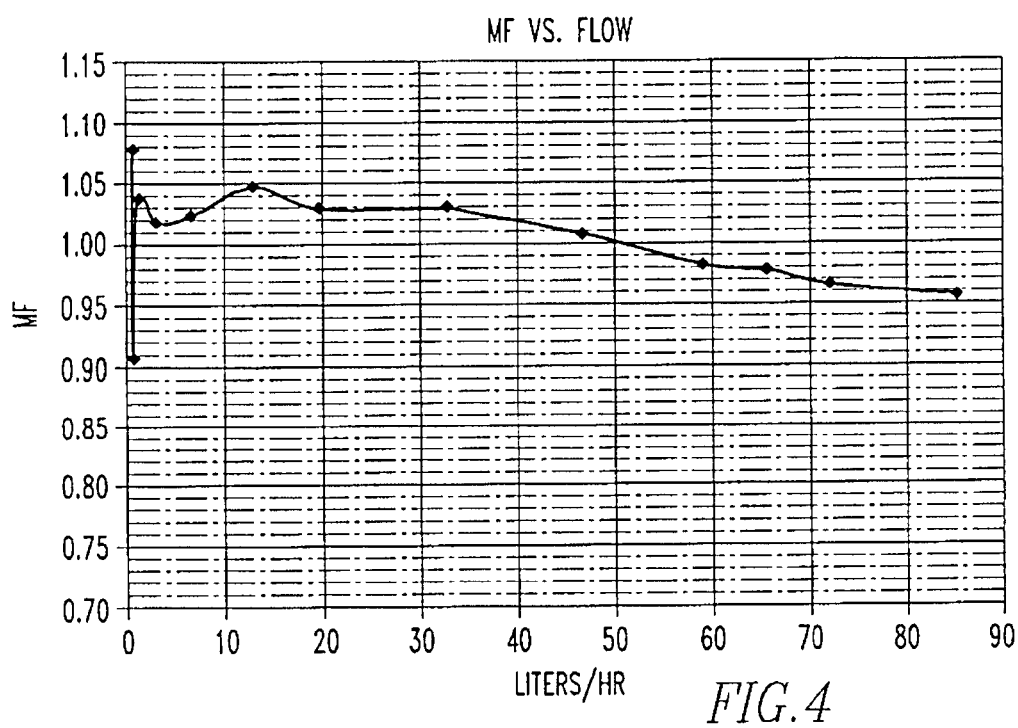
FIG. 4 shows a demonstration of transit time flow meter performance—a 4.5 mm diameter tube with 100 cSt Oil (3 Mhz Signal).

A flow rate of 1 liter/hour was measured and the signal to noise ratio improved by 10 times using the attenuative tube 14. Flow rates as low as 0.2 Liters/hour are readily achievable. Flow rates up to 90 liters/hour may also be analyzed. The low flow meter enables a chemical injection metering valve to dispense corrosion preventing chemicals to the subsea well at a low flow rate. The low flow meter is being used for chemical injection, but it could also be used for any application requiring a measurement at low flow rates. See FIG. 4 which shows a demonstration of transit time flow meter performance—a 4.5 mm diameter tube with 100 cSt Oil (3 MHz Signal).

During ultrasound transmission any sound which propagates at an angle after the transducer focal length is attenuated or absorbed within the sound absorber tube 14 walls. This allows a line of sight ultrasound signal to be received uninhibited from any other acoustic noise source. As a result the signal to noise ratio is greatly improved thereby enabling ultrasonic transit time flow measurements at very low flow rates that were not possible before since the SNR increased 10 times fold. This invention will be used in a low flow meter for monitoring fluid injection in subsea oil wells.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A flowmeter for detecting fluid flow rates in a pipe comprising:
   a tube having a channel disposed in the pipe through which fluid in the pipe flows, the tube is made entirely of a sound absorbing material so that essentially all non-fluid paths of sound are absorbed;
   an upstream ultrasonic transducer in contact with the pipe and positioned in alignment with the channel so plane waves generated by the upstream transducer propagates through the channel;
   a downstream ultrasonic transducer in contact with the pipe and positioned in alignment with the channel so plane waves generated by the downstream transducer propagate through the channel and are received by the upstream transducer which produces an upstream transducer signal, the downstream transducer receiving the plane waves from the upstream transducer and providing a downstream transducer signal;
   a controller in communication with the upstream and downstream transducers which calculate fluid flow rate in the upstream transducer signal and the downstream transducer signal; and
   wherein the tube is made of a polymer filled with attenuative particles, the upstream transducer and the downstream transducer extend through the pipe wall and acoustically communicate with the pipe interior and the attenuative particles are either metal, metal oxide, glass microspheres or rubber having a mesh size less or equal to an acoustic wavelength.

2. The flowmeter as described in claim 1 wherein the tube forms a seal with the pipe essentially preventing fluid in the pipe leaking around the tube.

3. The flowmeter as described in claim 2 wherein the polymer is either an epoxy, nylon, PTFE or PEEK.

4. The flowmeter as described in claim 3 wherein the tube has a length L and a diameter opening D such that under volume flow conditions where Q>0.2 liters/hour, the tube dimensions $L/D^2$ are greater than 1385/meters when C>1400 m/s.

5. A method for detecting fluid flow rates in a pipe comprising the steps of:
   flowing fluid through a channel of a tube disposed in the pipe;
   generating plane waves by an upstream ultrasonic transducer in contact with the pipe and positioned in alignment with the channel so the plane waves propagate through the channel and are received by a downstream transducer which produces a downstream transducer signal;
   generating plane waves by the downstream ultrasonic transducer in contact with the pipe and positioned in alignment with the channel so the plane waves propagate through the channel and are received by the upstream transducer which produces an upstream transducer signal;
   calculating with a controller in communication with the upstream and downstream transducers fluid flow rate from the upstream transducer signal and the downstream transducer signal, the tube is made of a sound absorbing material and wherein the generating plane waves by the upstream transducer step includes the step of generating the plane waves by the upstream transducer so that essentially all non-fluid paths of sound are absorbed by the tube, and wherein the generating plane waves by the downstream transducer step includes the step of generating the plane waves by the downstream transducer so that essentially all non-fluid paths of sound are absorbed by the tube; and wherein the tube is made of a polymer filled with attenuative particles, wherein the generating plane waves by the upstream transducer step includes the step of generating the plane waves by the upstream transducer which extends through the pipe wall and acoustically communicates with the pipe interior, and wherein the generating plane waves by the downstream transducer step includes the step of generating the plane waves by the downstream transducer which extends through the pipe wall and acoustically communicates with the pipe interior, and the attenuattive particles are either metal, metal oxide, glass microspheres or rubber having a mesh size less or equal to an acoustic wavelength.

6. The method as described in claim 5 wherein the tube forms a seal with the pipe essentially preventing fluid in the pipe leaking around the tube.

7. The method as described in claim 6 wherein the tube has a length L and a diameter opening D such that under volume flow conditions where $Q>0.2$ liters/hour, the tube dimensions $L/D^2$ are greater than 1385/meters when $C>1400$ m/s.

* * * * *